United States Patent [19]
Rohlfing

[11] 3,887,529
[45] June 3, 1975

[54] PREVENTING PLUGS IN TRANSFER CONDUITS

[75] Inventor: Raymond G. Rohlfing, Kapellen, Belgium

[73] Assignee: Phillips Petroleum Company, Bartlesville, Okla.

[22] Filed: Dec. 20, 1973

[21] Appl. No.: 426,699

[52] U.S. Cl. ............. 260/79; 260/79.1; 260/82.1; 260/92.8 A; 260/94.7 R; 260/94.9 F
[51] Int. Cl. ............................................. C08g 23/00
[58] Field of Search ....... 260/79, 79.1, 94.9 F, 82.1, 260/92.8 A, 94.7 R

[56] References Cited
UNITED STATES PATENTS

| | | | |
|---|---|---|---|
| 2,801,234 | 7/1957 | Hanson | 260/96 R |
| 3,407,182 | 10/1968 | Hinton | 260/79 |
| 3,450,183 | 6/1969 | Hinton | 260/94.9 F |
| 3,478,000 | 11/1969 | Saunders et al. | 260/79.1 |
| 3,707,528 | 12/1972 | Miles | 260/79 |
| 3,770,709 | 11/1973 | Tegge et al. | 260/94.9 F |

*Primary Examiner*—Melvyn I. Marquis

[57] ABSTRACT

Plugging of a transfer conduit through which a plug-forming material is passed is prevented by flushing the conduit with a solvent which is subsequently flashed to prevent the solvent from interfering with processing of the plug-forming material.

9 Claims, 1 Drawing Figure

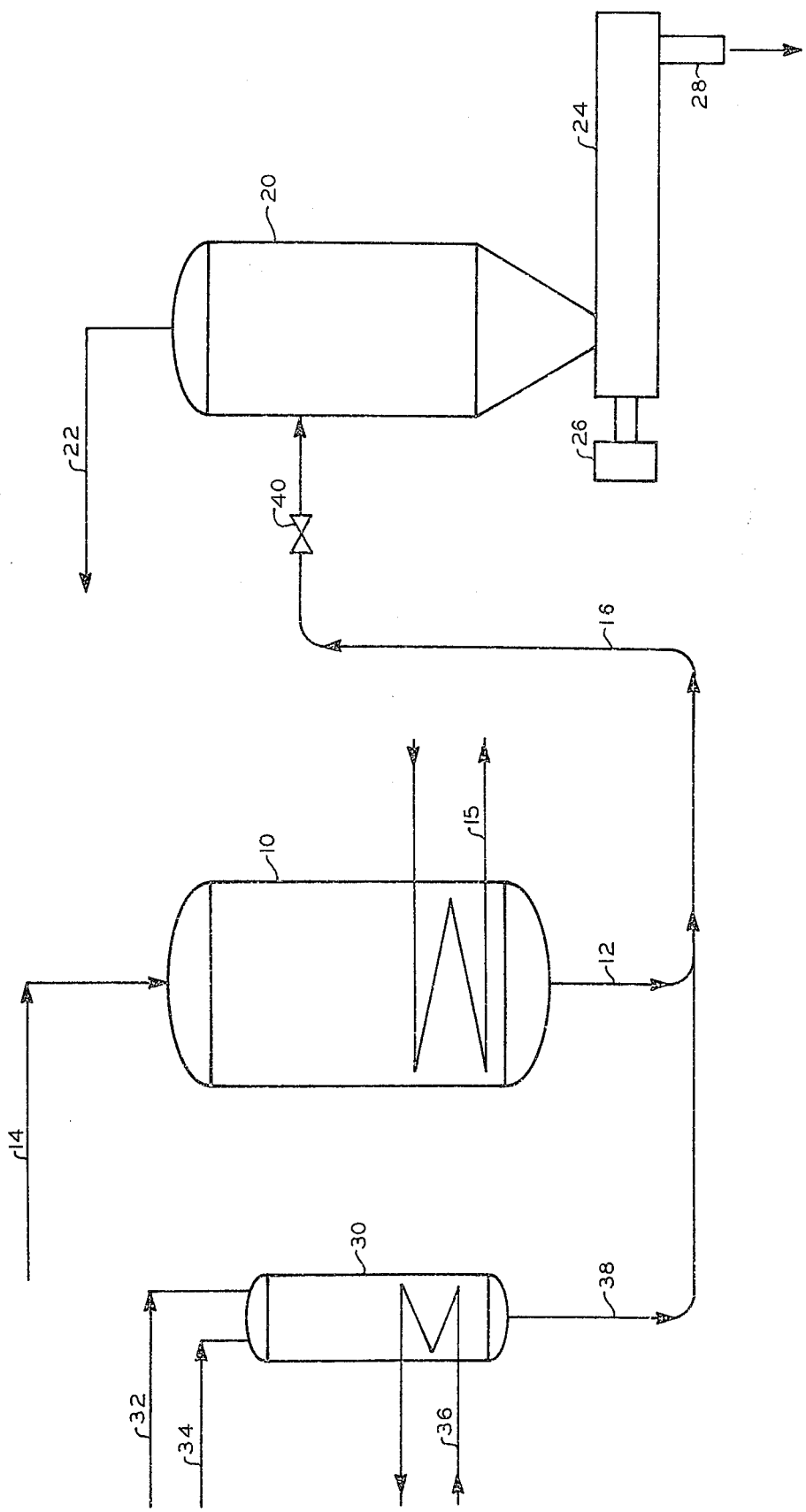

3,887,529

PREVENTING PLUGS IN TRANSFER CONDUITS

BACKGROUND OF THE INVENTION

The invention relates to a process for preventing plugs in a transfer conduit through which a plug-forming material is passed.

In manufacturing and handling various plug-forming materials, frequently considerable difficulty is encountered due to plugging of the transfer conduits and associated equipment including pipes, valves, vessels, level controls, meters, etc. By plugging it is meant that the passage through the transfer conduit is closed off thereby preventing the transfer of material therethrough. Precautions such as heating the transfer conduit prior to passing the material through it and minimizing the length of the conduit as much as possible have not solved the problem in many cases.

It is an object of the invention to prevent plugging of a transfer conduit through which a plug-forming material is passed.

Another object of the invention is to prevent plugging of a transfer conduit through which plug-forming material is passed without interfering with the processing of the plug-forming material.

Other aspects, objects and advantages of this invention will be apparent to one skilled in the art upon studying the specification, drawing, and the appended claims.

SUMMARY OF THE INVENTION

In accordance with the invention plugging of a transfer conduit through which a plug-forming material is passed when transferred from a first zone to a second zone is prevented by flushing with a liquid which is a solvent for the plug-forming material which solvent is passed through the transfer conduit at a temperature and pressure which causes a sufficient portion of the solvent to flash to prevent the solvent from interfering with the processing of the plug-forming material when the solvent is introduced into the second zone.

DETAILED DESCRIPTION OF THE INVENTION

In a preferred embodiment of the invention as illustrated in the attached drawing, the invention will be more fully described. The drawing shows part of a process for the production of polyphenylene sulfide.

Para-dichlorobenzene, N-methyl-2-pyrrolidone and sodium sulfide were fed to reactor 10 as a first zone via line 14. Heat was added to the reactor via heating coil 15. After the reaction the polyphenylene sulfide product was present as solid particles in reactor 10 admixed with the N-methyl-2-pyrrolidone in the form of a slurry. This slurry was removed from reactor 10 via lines 12 and 16 and passed to separator 20 as a second zone. Lines 12 and 16 were jacketed and heated to promote flashing of the organic amide upon entrance to the separator 20. The pressure in separator 20 (approximately 0–10 psig) was considerably lower than the pressure in reactor 10 (approximately 125–175 psig) which caused a substantial portion of the N-methyl-2-pyrrolidone to flash upon passage through pressure-reduction valve 40. Valve 40 was located in transfer conduit 16 as close to separator 20 as possible. The flashed liquid was removed from separator 20 as vapor via line 22. The polyphenylene sulfide mixed with residual liquid N-methyl-2-pyrrolidone was passed to a mixer-dryer 24 driven by power means 26. The mixer-dryer was used to break up any large particles of the polymer while evaporating additional N-methyl-2-pyrrolidone and the polymer then exited the mixer via 28 and was further processed. A portion of the polyphenylene sulfide tended to deposit on the transfer conduit lines 12 and 16. To remove this deposit in accordance with the invention, N-methyl-2-pyrrolidone as a solvent for the polyphenylene sulfide was passed via line 32 to a vessel 30 and heated via heating coil 36 to a temperature in the range of from about 500°–550°F. Other organic amides can be used. The vessel 30 containing the solvent was pressurized with an inert gas via 34 to a pressure in the range of from about 125–175 psia. The solvent was then used to flush the transfer conduit lines 12 and 16 via line 38 to remove deposits of the polyphenylene sulfide. The temperature and pressure of the solvent were high enough to cause at least a sufficient portion of the solvent to flash in separator 20 to prevent that portion of the solvent which did not flash from causing the polymer to become pasty and thus overloading the power means 26. A flush volume of solvent equal to approximately three times the displacement volume of the transfer conduit lines 12 and 16 was used. Although the exact flush volume of solvent is not critical, as small amount as possible should be used. In the present embodiment, the solvent used was relatively expensive and the greater amount flashed and removed via line 22 for recycling to vessel 30 the more economical the process.

The present invention as described in the specific embodiment above was very effective in eliminating the hazardous and costly plugging problem in the production of polyphenylene sulfide. It is emphasized that the present invention is not limited to the production of polyphenylene sulfide, but it can be used in any process in which a plug-forming material is passed from a first zone to a second zone through a transfer conduit; a solvent for the material can be used to remove deposits of the material in the lines; and a portion of the solvent is subsequently flashed in the second zone. For example, polypropylene can thus be removed from a conduit by passing hot xylenes through the conduit. Polybutadiene can similarly be removed by use of hot toluene. Polyethylene can be removed by use of hot cyclohexane. It is noted that although the process as described above was a batch-type process, it is envisioned that the invention is operable in a continuous process where the flushing operation is done intermittently.

What is claimed is:

1. A method to prevent plugging of a transfer conduit through which a plug-forming material is passed when transferred from a first zone to a second zone, comprising: flushing said transfer conduit with a liquid which is a solvent for said plug-forming material wherein said solvent is at a temperature and pressure sufficient to maintain said solvent in the liquid phase in said transfer conduit but which causes at least a sufficient portion of said solvent to flash in said second zone to prevent said solvent from interfering with the processing of said plug-forming material in said second zone when said solvent is introduced into said second zone.

2. The method of claim 1 wherein said plug-forming material is a polymer.

3. The method of claim 2 wherein said polymer is a poly(arylene sulfide).

4. The method of claim 3 wherein said poly(arylene sulfide) is polyphenylene sulfide.

5. The method of claim 3 wherein said solvent is an organic amide.

6. The method of claim 5 wherein said organic amide is N-methyl-2-pyrrolidone.

7. The method of claim 2 wherein said first zone is a reactor in which the polymer is formed; said second zone is a separator having a mixer-dryer attached thereto for processing the polymer, said mixer-dryer being driven by a power means; and interfering with the processing of said plug-forming material arises when that portion of the solvent which did not flash in the separator causes the polymer to become pasty and the pasty polymer overloads the power means of the mixer-dryer.

8. The method of claim 1 wherein the plug-forming material is polyphenylene sulfide, the liquid solvent for the polyphenylene sulfide is N-methyl-2-pyrrolidone, the temperature of the N-methyl-2-pyrrolidone in said transfer conduit ranges from about 500° to about 550°F, the pressure of the N-methyl-2-pyrrolidone in said transfer conduit ranges from about 125 to about 175 psig, and the pressure in said second zone ranges from about 0 to about 10 psig.

9. The method of claim 7 wherein the polymer is polyphenylene sulfide, the liquid solvent for the polyphenylene sulfide is N-methyl-2-pyrrolidone, the temperature of the N-methyl-2-pyrrolidone in said transfer conduit ranges from about 500° to about 550°F, the pressure of the N-methyl-2-pyrrolidone in said transfer conduit ranges from about 125 to about 175 psig, and the pressure in the separator ranges from about 0 to about 10 psig.

* * * * *